US010764607B2

(12) United States Patent
Bjorklund et al.

(10) Patent No.: US 10,764,607 B2
(45) Date of Patent: Sep. 1, 2020

(54) DATA PROCESSING SYSTEMS FOR ENCODING VIDEO DATA

(71) Applicant: Arm Limited, Cambridge (GB)

(72) Inventors: John Nils Andreas Bjorklund, Lund (SE); Sven Ola Johannes Hugosson, Lund (SE); Fredrik Peter Stolt, Lund (SE)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 15/950,730

(22) Filed: Apr. 11, 2018

(65) Prior Publication Data

US 2019/0320208 A1    Oct. 17, 2019

(51) Int. Cl.
  *H04N 19/86* (2014.01)
  *H04N 19/70* (2014.01)
  *H04N 19/176* (2014.01)
  *H04N 19/117* (2014.01)

(52) U.S. Cl.
  CPC .......... *H04N 19/86* (2014.11); *H04N 19/117* (2014.11); *H04N 19/176* (2014.11); *H04N 19/70* (2014.11)

(58) Field of Classification Search
  None
  See application file for complete search history.

(56) References Cited

U.S. PATENT DOCUMENTS

2019/0052878 A1 *   2/2019   Zhao ................... H04N 19/124

OTHER PUBLICATIONS

Fu CM, Alshina E, Alshin A, Huang YW, Chen CY, Tsai CY, Hsu CW, Lei SM, Park JH, Han WJ. Sample adaptive offset in the HEVC standard. IEEE Transactions on Circuits and Systems for Video technology. Dec. 2012;22(12):1755-64. (Year: 2012).*
Choi Y, Joo J. Exploration of practical HEVC/H. 265 sample adaptive offset encoding policies. IEEE Signal Processing Letters. Oct. 13, 2014;22(4):465-8. (Year: 2014).*
Choi, Yongseok, and Jaehwan Joo. "Exploration of practical HEVC/H. 265 sample adaptive offset encoding policies." IEEE Signal Processing Letters 22, No. 4 (2014): 465-468. (Year: 2014).*

(Continued)

*Primary Examiner* — Clifford Hilaire
(74) *Attorney, Agent, or Firm* — Vierra Magen Marcus LLP

(57) ABSTRACT

When encoding an array of data elements of a stream of arrays of data elements, a set of sample adaptive offset options to be used for encoding the array are selecting on the basis of a distortion value that is determined for a particular set of sample adaptive offset options. The distortion value is determined by generating one or more filtered reconstructed source blocks by applying a sample adaptive offset filter in accordance with the particular set of sample adaptive offset options to one or more reconstructed source blocks corresponding to a source block, and by then determining a distortion value for the particular set of sample adaptive offset options by comparing the one or more filtered reconstructed source blocks with the source block. When the particular set of sample adaptive offset options comprises an edge offset type, the distortion value is determined using a set of error values comprising fewer data elements than the source block of data elements.

19 Claims, 5 Drawing Sheets

(56) References Cited

OTHER PUBLICATIONS

Zhang, et al., "Improved Sample Adaptive Offset for HEVC," Oct. 2013, Signal and Information Processing Association Annual Summit and Conference, DOI: 10.1109/APSIPA, 2013.6694134.
Sullivan, et al., "Overview of the High Efficiency Video Coding (HEVC) Standard," Dec. 2012, IEEE Transactions on Circuits and Systems for Video Technology, vol. 22, Issue 12, DOI: 10.1109/TCSVT.2012.2221191.

* cited by examiner

DATA PROCESSING SYSTEMS FOR ENCODING VIDEO DATA

BACKGROUND

The technology described herein relates to a method of and apparatus for selecting sample adaptive offset options to use when encoding an array of data elements of a stream of arrays of data elements.

It is common to encode a stream of arrays of data elements, such as arrays of image data values (e.g. frames of video for display), so as to compress the data in order to reduce bandwidth and memory consumption. This is particularly desirable in data processing apparatus, e.g. of portable devices, where processing resources and power may be limited.

In order to encode a stream of arrays of data elements, each array of data elements is often divided into smaller "source" blocks of data elements and encoded on a block by block basis.

A de-blocking filter is often applied near or at the end of the decoding process, e.g. in the High Efficiency Video Coding (HEVC) standard, in order to try to improve visual quality by smoothing sharp edges which can form between or within blocks. This is then followed by a sample adaptive offset (SAO) filter, which attempts to reduce banding and ringing artefacts.

The Applicants believe that there remains scope for improvements to techniques for encoding streams of arrays of data elements.

BRIEF DESCRIPTION OF THE DRAWINGS

Various embodiments of the technology described herein will now be described by way of example only and with reference to the accompanying drawings, in which.

DETAILED DESCRIPTION

Figure 1:
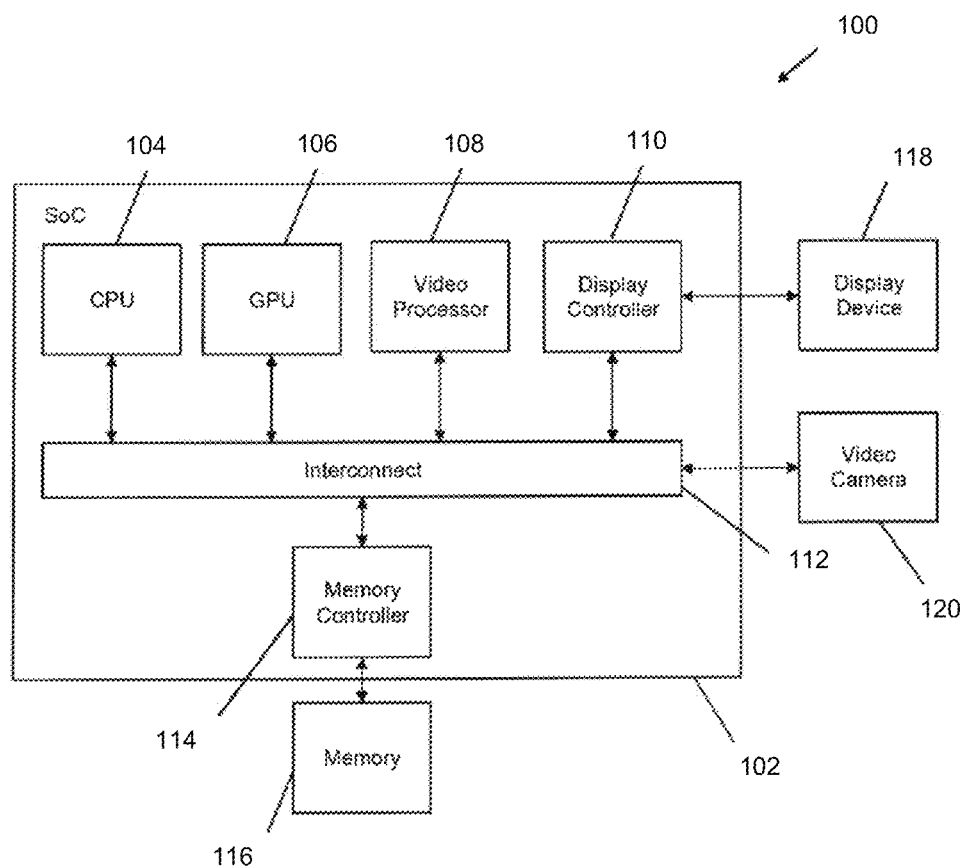
FIG. 1 shows schematically a data processing system according to embodiments of the technology described herein.

A first embodiment of the technology described herein comprises a method of selecting sample adaptive offset options to use when encoding an array of data elements of a stream of arrays of data elements, the method comprising:
determining a distortion value for a particular set of sample adaptive offset options by:
generating one or more filtered reconstructed source blocks by applying a sample adaptive offset filter in accordance with the particular set of sample adaptive offset options to one or more reconstructed source blocks corresponding to a source block of the array of data elements being encoded;
generating a set of error values by comparing the one or more filtered reconstructed source blocks with the source block; and
determining a distortion value for the particular set of sample adaptive offset options using the set of error values;
the method further comprising:
selecting, based on the distortion value, whether to encode the source block using the particular set of sample adaptive offset options;
wherein when the particular set of sample adaptive offset options comprises an edge offset, the distortion value is determined using a set of error values comprising fewer data elements than the source block of data elements.

A second embodiment of the technology described herein comprises an apparatus for selecting sample adaptive offset options to use when encoding an array of data elements of a stream of arrays of data elements, the apparatus comprising:
distortion value determining circuitry, operable to determine a distortion value for a particular set of sample adaptive offset options by:
generating one or more filtered reconstructed source blocks by applying a sample adaptive offset filter in accordance with the particular set of sample adaptive offset options to one or more reconstructed source blocks corresponding to a source block of the array of data elements being encoded;
generating a set of error values by comparing the one or more filtered reconstructed source blocks with the source block; and
determining a distortion value for the particular set of sample adaptive offset options using the set of error values; and
sample adaptive offset option selection circuitry operable to select a set of sample adaptive offset options to be used when encoding the source block based on the distortion value;
wherein the distortion value determining circuitry is operable, when the particular set of sample adaptive offset options comprises an edge offset, to determine the distortion value using a set of error values comprising fewer data elements than the source block of data elements.

The technology described herein relates to a method of selecting sample adaptive offset (SAO) filter options to use when encoding a particular source block of data elements of an array of data elements (e.g. a frame of video for display). In the technology described herein, a distortion value is determined for a particular set of sample adaptive offset options, and used to select whether (or not) to encode the source block using the particular set of sample adaptive offset options.

In the technology described herein, rather than determining the distortion value using a reconstructed source block that has been subjecting to de-blocking (i.e. using a de-blocked reconstructed source block), the distortion value is instead determined using one or more reconstructed source blocks that has not been (has other than been) de-blocked (i.e. using one or more reconstructed source blocks), e.g. prior to the one or more reconstructed source blocks being de-blocked.

As will be described in more detail below, the Applicants have recognised that it is possible to make the sample adaptive offset filter selection using the one or more reconstructed source blocks before they are de-blocked, and moreover that doing this can reduce the complexity of and the memory requirements for the encoding process. This in turn means that the processing and/or memory bandwidth requirements for the encoding operation can be reduced, thereby reducing the power and bandwidth requirements and/or increasing the performance of the overall data processing system.

The Applicants have furthermore recognised that determining the distortion value using one or more reconstructed source blocks that has not been (has other than been) de-blocked could result in a distortion value that does not accurately reflect the combined effect of the de-blocking filter and the sample adaptive offset filter (in accordance with the particular set of sample adaptive offset options), e.g. since determining the distortion value in this manner will not take into account the effect of the de-blocking filter. This could lead to sub-optimal choices of sample adaptive offset filter options.

To counteract this, in the technology described herein, when the particular set of sample adaptive offset options comprises an edge offset sample adaptive offset type, the distortion value is determined using a set of error values comprising fewer data elements than the source block of data elements, i.e. instead of using a set of error values comprising the same number of data elements as the source block of data elements. As will be described in more detail below, the Applicants have found that this can result in a distortion value that can more accurately reflect the combined effect of the de-blocking filter and the edge offset type sample adaptive offset filter, and can thereby improve the accuracy of the sample adaptive offset options selection process.

It will be appreciated, therefore, that the technology described herein provides an improved method and apparatus for selecting sample adaptive offset options to use when encoding an array of data elements of a stream of arrays of data elements.

The arrays of data elements of the stream of arrays may take any suitable form. In various embodiments, the arrays of data elements may each correspond to an array of data positions. The arrays of data elements or positions may correspond to all or part of an (e.g. image) output, such as a frame (e.g. for display). There may be any suitable correspondence between the data elements or positions and the output. Thus, the data elements or positions of the arrays may each correspond to a pixel or pixels of an output. The arrays of data elements can be any suitable size or shape in terms of data elements or positions, but are in various embodiments rectangular (including square). The data elements may also have any suitable format, for example that represents image data values (e.g. colour values).

The arrays of data elements may comprise respective video frames (images), e.g. of a stream (a sequence) of video frames, but other arrangements would be possible if desired. Thus, in various embodiments, the method comprises a method of encoding a video frame of a stream (a sequence) of video frames.

The arrays of data elements may be provided in any suitable way. Various embodiments may comprise generating (at least some or all of) the data elements of the arrays. Various embodiments may also or instead comprise reading in (at least some or all of) the data elements of the arrays, e.g. from memory.

The data elements of the arrays may be generated in any suitable way. In various embodiments, the data elements of the arrays may be generated by a video camera. In other embodiments, generating the data elements of the arrays may comprise a rendering process. The rendering process may comprise deriving the data values represented by the data elements of the arrays (e.g. by rasterising primitives to generate graphics fragments and/or by rendering graphics fragments). A graphics processor (a graphics processing pipeline) may be used in order to generate the data elements of the arrays. The graphics processing pipeline may contain any suitable processing stages that a graphics pipeline and processor may contain, such as a vertex shader, a rasterisation stage (a rasteriser), a rendering stage (a renderer), etc., in order to generate the data elements of the arrays.

In the technology described herein, a set of sample adaptive offset options is selected for use when encoding the array of data elements. The selection may be made when encoding the array of data elements, e.g. as part of the encoding process.

In various embodiments, each array of data elements (e.g. video frame) is encoded by dividing the array of data elements into plural blocks of data elements (e.g. plural "source" blocks), and then (independently) subjecting each of the source blocks to one or more encoding operations, e.g. encoding the array of data elements on a block by block basis.

The division of each data array into plural source blocks of data elements may be done in any suitable manner, and each source block of data elements may take any suitable form. Each source block of data elements can be any suitable size or shape in terms of data elements or positions, but is in various embodiments rectangular (including square). For example, each source block of data elements may be 16×16, 32×32, 64×64 etc., data elements or positions in size.

In various embodiments, each source block of data elements may be one of plural source blocks that the array of data elements is divided into for encoding purposes. For example, each source block of data elements may comprise a Coding Tree Unit (CTU) of plural CTUs that the array of data elements (e.g. video frame) is divided into for encoding purposes. These plural source blocks may be non-overlapping and/or may be similar or different in size or shape.

Thus, in various embodiments, each data array is divided into plural equally sized and/or non-overlapping (source) blocks of data elements. The array of data elements (e.g. video frame) can be any suitable size, shape or configuration in terms of such blocks.

Each source block of data elements (e.g. CTU) may be (independently) subjected to one or more encoding operations (e.g. (independently) encoded) in any suitable manner.

In various embodiments, for each source block of data elements (e.g. CTU), a particular set of encoding options that is to be used to encode that source block of data elements is initially selected. In particular, the particular size and/or configuration of one or more sub-blocks (sub-arrays) that the source block of data elements is to be divided into (in terms of data elements) (for encoding purposes), an encoding mode(s) that is to be used, the particular way in which the one or more reference blocks is or are derived (e.g. the mode used, such as intra, inter, forward, backward, uni-directional, bi-directional, merge, etc. mode, and/or the motion vector used), etc., may be selected for (and may be different for) each source block of data elements (e.g. each CTU) of the array of data elements (e.g. video frame).

The particular set of encoding options that is to be used for a particular source block of data elements may be selected in any suitable manner. In various embodiments this is done by calculating a cost value for each of various different sets of encoding options for one or more source blocks, and then selecting one or more particular sets of encoding options to use when encoding that source block(s), e.g. that have an acceptably low cost value. This may be done, for example, using a "Rate Distortion Optimisation" (RDO) process, or similar.

Thus, in various embodiments, when encoding a source block of data elements of the array of data elements, the source block (e.g. CTU) may be (optionally) sub-divided into plural sub-blocks (sub-arrays) of data elements, e.g. for further encoding.

In these embodiments, each source block of data elements (e.g. CTU) may be divided into plural sub-blocks of data elements in any suitable manner, and each sub-block of data elements may take any suitable form. Each sub-block of data elements can be any suitable size or shape in terms of data elements or positions, but is in various embodiments rectangular (including square). For example, each sub-block of data elements may be 4×4, 4×8, 8×4, 8×8, 8×16, 16×8, 16×16, 16×32, 32×16, 32×32, 32×64, 64×32, 64×64 etc., data elements or positions in size.

In various embodiments, each sub-block of data elements comprises a Coding Unit (CU) of plural CUs that the source block of data elements (e.g. CTU) is divided into for encoding purposes. These plural sub-blocks may be non-overlapping and/or may be the same or different in size or shape. The manner in which the source block of data elements is sub-divided into plural sub-blocks of data elements may be determined by the Rate Distortion Optimisation (RDO) process.

Thus, in various embodiments, each source block of data elements (e.g. CTU) is optionally divided into plural non-overlapping sub-blocks of data elements (e.g. CUs).

In the technology described herein, a distortion value is determined for a particular set of sample adaptive offset options by applying a sample adaptive offset filter in accordance with the particular set of sample adaptive offset options to one or more reconstructed source blocks corresponding to the source block being encoded, generating a set of error values by comparing the one or more filtered reconstructed source blocks with the source block, and by then determining a distortion value for the particular set of sample adaptive offset options using the set of error values.

The particular set of sample adaptive offset options may be characterised by any one or more suitable sample adaptive offset options. As will be described in more detail below, the one or more sample adaptive offset options that characterise the particular set of sample adaptive offset options may include, for example, a sample adaptive offset type (e.g. whether the sample adaptive offset comprises an "edge offset" type or a "band offset" type), the particular offset of offsets to be used, a direction in which the offset of offsets should be applied, etc.

One or more different sets of sample adaptive offset options may be considered for selection when encoding the source block of data elements. The one or more sample adaptive offset options that characterise the particular set of sample adaptive offset options may accordingly differentiate that particular set of sample adaptive offset options from the one or more different sets of sample adaptive offset options that are considered for selection.

The one or more reconstructed source blocks can take any suitable form that corresponds to the source block, and can be generated in any suitable manner. According to various embodiments, the one or more reconstructed source blocks are generated using the source block and one or more reference blocks of data elements corresponding to the source block, e.g. where the one or more reference blocks of data elements are derived from one or more arrays of data elements of the stream of arrays of data elements.

Thus, the method may comprise using the source block and one or more reference blocks of data elements derived from one or more arrays of data elements of the stream of arrays of data elements to generate the one or more reconstructed source blocks corresponding to the source block (and the apparatus may comprise reconstructed source block generating circuitry operable to generate one or more reconstructed source blocks corresponding to a source block of data elements of the array of data elements being encoded using the source block and one or more reference blocks of data elements derived from one or more arrays of data elements of the stream of arrays of data elements).

The one or more reference (e.g. predicted) blocks may be derived in any suitable manner. In various embodiments, one or more reference blocks may be derived from the same array of data elements as the source block (using an "intra" mode). Additionally or alternatively, one or more reference blocks may be derived from one or more different arrays of data elements in the stream of arrays (using an "inter" mode). The one or more different arrays may comprise one or more previous arrays of data elements (using a "forwards" mode) and/or one or more subsequent arrays of data elements (using a "backwards" mode).

In various embodiments, the one or more reference (e.g. predicted) blocks are derived using one or more motion vectors, e.g. that are determined as part of the Rate Distortion Optimisation (RDO) process.

As will be appreciated, each of the one or more motion vectors may indicate how to derive the data elements of a reference block from the one or more arrays of data elements (e.g. by translating, rotating, scaling, etc.). The method may further comprise performing, and the apparatus may further comprise processing circuitry configured to perform, a motion compensation process that applies the one or more motion vectors to the one or more arrays of data elements to derive the one or more reference blocks. Thus, in embodiments, the one or more reference blocks may comprise one or more motion-compensated "prediction" blocks.

Where, as described above, the source block (e.g. CTU) is sub-divided into plural sub-blocks of data elements (e.g. plural CUs) for encoding, then plural reference blocks may be (derived and) used to generated the one or more reconstructed source blocks, e.g. where one or more or each reference block respectively corresponds in size and/or shape (in terms of array elements) to the size and/or shape of a corresponding sub-block (e.g. CU) that the source block (e.g. CTU) is divided into (and where the combination of all of the plural reference blocks may correspond (in terms of array elements) to the size and/or shape of the source block (e.g. CTU)).

Correspondingly, where the source block (e.g. CTU) is sub-divided into plural sub-blocks of data elements (e.g. plural CUs) for encoding, then, plural reconstructed source blocks (e.g. plural reconstructed CU blocks) may be generated, e.g. where one or more or each reconstructed source block respectively corresponds in size and/or shape (in terms of array elements) to the size and/or shape of a corresponding sub-block (e.g. CU) that the source block (e.g. CTU) is divided into (and where the combination of all of the plural reconstructed source blocks may correspond (in terms of array elements) to the size and/or shape of the source block (e.g. CTU)).

Where, on the other hand, the source block (e.g. CTU) is not (is other than) sub-divided for encoding (e.g. where the source block (e.g. CTU) is encoded as a whole (e.g. using a single CU)), then a single reference block may be (derived and) used to generated the reconstructed source block. In this case, the reference block may correspond in size and/or shape (in terms of array elements) to the size and/or shape of the source block (e.g. CTU). Correspondingly, in this case, a single reconstructed source block may be generated, e.g. where the reconstructed source block may correspond in size and/or shape (in terms of array elements) to the size and/or shape of the source block (e.g. CTU).

The source block and the one or more reference blocks may be used to generate the one or more reconstructed source blocks that correspond to the source block in any suitable manner.

In various embodiments, this may comprise:
generating an array of difference values that represents the difference between the source block a reference block;
generating an array of frequency domain coefficients corresponding to the array of difference values by applying a forward transformation process to the array of difference values;
generating an array of quantized frequency domain coefficients by applying a quantization process to the array of frequency domain coefficients;
generating an array of de-quantised frequency domain coefficients by applying a de-quantisation process to the array of quantised frequency domain coefficients;
generating an array of reconstructed difference values by applying an inverse transformation process to the array of de-quantised frequency domain coefficients; and
generating a reconstructed source block by combining the array of reconstructed difference values and the reference block.

Where, as described above, the source block (e.g. CTU) is sub-divided into plural sub-blocks of data elements (e.g. plural CUs) for encoding, then this process may be performed in respect of each sub-block (e.g. in respect of each CU).

Generating an array of difference values can take any suitable form. In various embodiments, generating an array of difference values may comprise subtracting the values of the data elements of the source block respectively from the values of the corresponding (in terms of data position) data elements of the corresponding reference block (of the one or more reference blocks), or vice versa.

The forward transformation process can take any suitable form that generates an array of frequency domain coefficients. In various embodiments, the forward transformation process may be substantially linear and/or orthogonal and/or invertible and/or discrete. The forward transformation process may be defined by the particular standard (e.g. HEVC standard) to be used when encoding the array of data elements. The forward transformation process may, for example, be a forward Discrete Cosine Transform (DCT).

The quantisation process can take any suitable form. In various embodiments, applying the quantisation process may comprise respectively quantising (e.g. division by a quantisation constant and/or truncating and/or rounding) the frequency domain coefficients of the array of frequency domain coefficients. The quantisation may be defined by the particular standard (e.g. HEVC standard) to be used when encoding the array of data elements.

The de-quantisation process can take any suitable form, for example that corresponds to the quantisation process. In various embodiments, applying the de-quantisation process may comprise respectively de-quantising (e.g. multiplying by a quantisation constant and/or padding with zeros) the quantized frequency domain coefficients of the array of quantised frequency domain coefficients. The de-quantisation may be defined by the particular standard (e.g. HEVC standard) to be used when encoding/decoding the array of data elements.

The inverse transformation process can take any suitable form that generates an array of reconstructed difference values, e.g. that corresponds to the forward transformation process. In various embodiments, the inverse transformation process may be substantially linear and/or orthogonal and/or invertible and/or discrete. The inverse transformation process may be defined by the particular standard (e.g. HEVC standard) to be used when encoding the array of data elements. The inverse transformation process may, for example, be an inverse Discrete Cosine Transform (DCT).

Generating a reconstructed source block can take any suitable form. In various embodiments, generating a reconstructed source block may comprise adding the values of the data elements of the reference block respectively to the values of the corresponding (in terms of data position) difference values of the array of reconstructed difference values.

Where, as described above, the source block (e.g. CTU) is sub-divided into plural sub-blocks of data elements (e.g. plural CUs) for encoding, then the (each) array of difference values and/or array of frequency domain coefficients and/or array of quantized frequency domain coefficients and/or array of de-quantised frequency domain coefficients and/or array of reconstructed difference values and/or reconstructed source block may correspond in size and/or shape (in terms of array elements) to the size and/or shape of the corresponding sub-block (e.g. CU) that the source block (e.g. CTU) is divided into and/or the corresponding reference block.

Where, on the other hand, the source block (e.g. CTU) is not (is other than) sub-divided for encoding (e.g. where the source block (e.g. CTU) is encoded as a whole (e.g. using a single CU)), then the array of difference values and/or array of frequency domain coefficients and/or array of quantized frequency domain coefficients and/or array of de-quantised frequency domain coefficients and/or array of reconstructed difference values and/or reconstructed source block may correspond in size and/or shape (in terms of array elements) to the size and/or shape of the source block (e.g. CTU) and/or the reference block.

The distortion value can be determined in any suitable manner. The distortion value may be indicative of an amount of distortion that would be introduced when encoding and then decoding the source block in accordance with the particular set of sample adaptive offset options under consideration.

In various embodiments, the distortion value is based on a set of error values that represent the difference between the original source block, and the reconstructed version of that source block following filtering the source block in accordance with the particular set of sample adaptive offset options under consideration.

In these embodiments, the set of error values is accordingly based on a comparison of the one or more filtered reconstructed source blocks with the original source block.

The one or more filtered reconstructed source blocks may be compared with (e.g. subtracted from) the original source block to generate a set of error values representing the difference between the original source block, and a filtered reconstructed version of that source block. In these embodiments, generating the set of error values may accordingly comprise subtracting the values of the data elements of the one or more filtered reconstructed source blocks respectively from the values of the corresponding (in terms of data position) data elements of the source block, or vice versa.

The set of error values may comprise an array of error values. When the particular set of sample adaptive offset options comprises an edge offset, the set of error values should comprise fewer data elements than the source block of data elements (but may correspond in shape to the shape of the source block (e.g. CTU)). On the other hand, when the particular set of sample adaptive offset options comprises some other type of SAO filter (e.g. band offset), the set of error values may comprise fewer data elements than the source block of data elements or may correspond in size and/or shape (in terms of array elements) to the size and/or shape of the source block (e.g. CTU).

The distortion value for the particular set of encoding options can be determined from the set of error values in any suitable manner. In various embodiments, determining the distortion value may comprise determining a sum-square of the error values of the set of error values.

In various embodiments, as well as being based on an error value for the particular set of sample adaptive offset options being considered, the selection of whether to encode the source block in accordance with the particular set of sample adaptive offset options takes account of, and is based on, a bit count value for (the number of bits needed for) encoding the source block using the particular set of sample adaptive offset options being considered.

Thus, in various embodiments, the method of the technology described herein comprises (and the apparatus of the technology described herein is configured to) selecting, based on the error value and a bit count value, whether to encode the source block in accordance with the particular set of sample adaptive offset options.

The step of selecting, based on the distortion value, e.g. and the bit count value, whether to encode the source block in accordance with the particular set of sample adaptive offset options can be performed in any suitable manner. In various embodiments, selecting whether to encode the source block in accordance with the particular set of sample adaptive offset options may comprise determining a cost value for the particular set of sample adaptive offset options based on the distortion value, e.g. and the bit count value, and selecting, based on the cost value, whether to encode the source block in accordance with the particular set of sample adaptive offset options. Determining the cost value may comprise combining the distortion value and the bit count value. The combination of the distortion value and the bit count value may be any suitable combination, such as a weighted combination of the distortion value and the bit count value.

In various embodiments, the particular set of sample adaptive offset options may be selected when the distortion value and/or the bit count value and/or the cost value is the lowest such value of plural such values determined for respective different sets of sample adaptive offset options. The particular set of sample adaptive offset options may also or instead be selected when the distortion value and/or the bit count value and/or the cost value is below a selection threshold for such a value.

As will be appreciated, the selecting processes that are performed in accordance with the particular set of sample adaptive offset options may, in practice, be performed respectively for each (e.g. every) one of plural different sets of sample adaptive offset options. This can allow, for example, for a more suitable set of sample adaptive offset options to be selected. As discussed above, the different sets of sample adaptive offset options may be characterised by, and may differ in respect of, one or more sample adaptive offset options as desired. As discussed above, the one or more sample adaptive offset options that characterise the sets of sample adaptive offset options may include, for example, a sample adaptive offset type (e.g. whether the sample adaptive offset comprises an "edge offset" type or a "band offset" type), the particular offset of offsets to be used, a direction in which the offset of offsets should be applied, etc.

Thus, the method may comprise selecting (and the apparatus may be configured to select), from plural sets of sample adaptive offset options, a particular set of sample adaptive offset options to use to encode the source block of data elements, e.g. by determining a distortion value, e.g. and a bit count value, for each set of the plural sets of sample adaptive offset options, and selecting the set of the plural sets of sample adaptive offset options for which the distortion value and/or the cost value is lowest to use to encode the source block.

As described above, in the technology described herein, when the particular set of sample adaptive offset options under consideration comprises the edge offset type of SAO filter, the distortion value is determined using a set of error values comprising fewer data elements than the number of data elements that make up the source block of data elements. In various embodiments, when the particular set of sample adaptive offset options comprises an edge offset sample adaptive offset type, the distortion value is determined using a set of error values comprising error values that respectively correspond to some but not all of the data elements of the source block and/or the data elements of the one or more reconstructed source blocks.

In these embodiments, the set of error values that is used to determine the distortion value may have any suitable form. In various embodiments, the set of error values comprises one or more arrays of error values.

Each array of error values may correspond in size and/or shape to a respective sub-region (e.g. sub-array of data elements) of each of the one or more reconstructed source blocks. That is, each array of error values may correspond to a sub-region (a sub-array) of one of the one or more reconstructed source blocks.

Each array of error values may have a size (in terms of array elements) that is smaller than the corresponding reconstructed source block, but may otherwise correspond in shape to the shape of the corresponding reconstructed source block. In various particular embodiments, each array of error values corresponds to an inner sub-region of the corresponding reconstructed source block, i.e. each error value of the error value array corresponds to only inner data elements (and not outer (border) data elements) of the corresponding reconstructed source block.

Thus, in various embodiments, each reconstructed source block comprises an array of reconstructed data elements, and each array of error values that is used to determine the distortion value (at least when the particular set of sample adaptive offset options comprises an edge offset) comprises only data elements that each correspond to an inner data element (and not an outer (border) data element) of the array of reconstructed data elements. Determining the distortion value using such arrays of error values (at least when the particular set of sample adaptive offset options comprises an edge offset) has been found to provide a distortion value that can more accurately reflect the combined effect of the de-blocking filter and the edge offset type sample adaptive offset filter.

In various particular embodiments, each array of error values corresponds to all of the inner data elements of the corresponding reconstructed source block (and only the (very) outer (border) data elements of the reconstructed source block do not have corresponding data elements in the array of error values). The Applicants have found that this facilitates a particularly robust SAO options selection process, i.e. where as many data elements as possible are considered in order to obtain an accurate distortion value, while significantly mitigating the effect of not taking the de-blocking filter process into account.

It would, however, be possible for one or more or each array of error values to comprise fewer data elements than all of the inner data elements of the corresponding reconstructed source block (and more than just the (very) outer (border) data elements of the reconstructed source block may not have corresponding data elements in the array of error values), if desired.

In these embodiments, it would be possible for the one or more filtered reconstructed source blocks that are generated by applying the sample adaptive offset filter in accordance with the particular set of sample adaptive offset options to the one or more reconstructed source blocks to correspond in size and/or shape to the one or more reconstructed source blocks and/or to the source block. In this case (when the particular set of sample adaptive offset options comprises an edge offset), the set of error values that is generated by comparing the one or more filtered reconstructed source blocks with the source block may have a size and/or shape (in terms of data elements) that corresponds to the size and/or shape of the one or more reconstructed source blocks and/or the source block.

However, in this case, the set of error values that is used to determine the distortion value (when the particular set of sample adaptive offset options comprises an edge offset) may comprise fewer data elements than the set of error values that is generated by comparing the one or more filtered reconstructed source blocks with the source block. That is, only a sub-set (some but not all) of the error values (e.g. only the inner error values of the array of error values) that are generated by comparing the one or more filtered reconstructed source blocks with the source block may be used in the distortion value determination step.

However, according to various other embodiments (when the particular set of sample adaptive offset options comprises an edge offset), the one or more filtered reconstructed source blocks that are generated by applying the sample adaptive offset filter in accordance with the particular set of sample adaptive offset options to the one or more reconstructed source blocks may comprise fewer data elements than the one or more reconstructed source blocks and/or the source block.

In this case (when the particular set of sample adaptive offset options comprises an edge offset), the set of error values that is generated by comparing the one or more filtered reconstructed source blocks with the source block may have a size and/or shape (in terms of data elements) that corresponds to the size and/or shape of the array of error values that is used to determine the distortion value (as described above).

In these embodiments, (when the particular set of sample adaptive offset options comprises an edge offset), the step of generating one or more filtered reconstructed source blocks by applying a sample adaptive offset filter in accordance with the particular set of sample adaptive offset options to one or more reconstructed source blocks may be simplified, e.g. because a reduced number of calculations will need to be performed, and because data elements of reconstructed source blocks outside the "current" reconstructed source block need not be considered and stored.

In various embodiments, when the particular set of sample adaptive offset options comprises another sample adaptive offset filter type (i.e. other than an edge offset sample adaptive offset filter type), e.g. when the particular set of sample adaptive offset options comprises a band offset, then the distortion value may be determined either using a set of error values comprising the same number of data elements as the source block of data elements or using a set of error values comprising fewer data elements than the source block of data elements, e.g. in the manner described above.

In this regard, the Applicants have found that band offset sample adaptive offset filtering is less susceptible to inaccuracies in the distortion value that may arise from not taking the effects of the de-blocking filter into account. Thus, in the case of band offset sample adaptive offset filtering, error values corresponding to either all of the (data elements of the) one or more reconstructed source blocks, or one or more sub-regions of the one or more reconstructed source blocks can be used to determine a distortion value that is a sufficiently accurate reflection of the combined effect of the de-blocking filter and the band offset sample adaptive offset filter (in accordance with the particular set of sample adaptive offset options).

In various embodiments, the particular selected set of sample adaptive offset options may be stored and/or transmitted, as desired.

In various embodiments, selecting whether to encode the source block using the particular set of sample adaptive offset options may be followed by generating a de-blocked reconstructed source block by applying a de-blocking filter to the one or more reconstructed source blocks, and then generating a filtered de-blocked reconstructed source block by applying a sample adaptive offset filter in accordance with the selected set of sample adaptive offset options to the de-blocked reconstructed source block.

Thus, another embodiment of the technology described herein comprises a method of encoding an array of data elements of a stream of arrays of data elements, the method comprising:

when encoding a source block of data elements of the array of data elements:
using the source block and one or more reference blocks of data elements derived from one or more arrays of data elements of the stream of arrays of data elements to generate one or more reconstructed source blocks corresponding to the source block; and
in accordance with a particular set of sample adaptive offset options:
generating one or more filtered reconstructed source blocks by applying a sample adaptive offset filter in accordance with the particular set of sample adaptive offset options to the one or more reconstructed source blocks;
generating a set of error values by comparing the one or more filtered reconstructed source blocks with the source block; and
determining a distortion value for the particular set of sample adaptive offset options using the set of error values; and
selecting, based on the distortion value, whether to encode the source block using the particular set of sample adaptive offset options;

the method further comprising:
generating a de-blocked reconstructed source block by applying a de-blocking filter to the one or more reconstructed source blocks; and then
generating a filtered de-blocked reconstructed source block by applying a sample adaptive offset filter in accordance with the selected set of sample adaptive offset options to the de-blocked reconstructed source block.

Another embodiment of the technology described herein comprises an apparatus for encoding an array of data elements of a stream of arrays of data elements, the apparatus comprising:
reconstructed source block generating circuitry operable to generate one or more reconstructed source blocks corresponding to a source block of data elements of the array of data elements being encoded using the source block and one or more reference blocks of data elements derived from one or more arrays of data elements of the stream of arrays of data elements; and
sample adaptive offset option selection circuitry operable to select a set of sample adaptive offset options to be used to encode the source block by:
generating one or more filtered reconstructed source blocks by applying a sample adaptive offset filter in accordance with a particular set of sample adaptive offset options to the one or more reconstructed source blocks;
generating a set of error values by comparing the one or more filtered reconstructed source blocks with the source block; and
determining a distortion value for the particular set of sample adaptive offset options using the set of error values; and
selecting, based on the distortion value, whether to encode the source block using the particular set of sample adaptive offset options;
the apparatus further comprising:
de-blocking circuitry operable to generate a de-blocked reconstructed source block by applying a de-blocking filter to the one or more reconstructed source blocks; and
sample adaptive offset circuitry operable to generate a filtered de-blocked reconstructed source block by applying a sample adaptive offset filter in accordance with the selected set of sample adaptive offset options to the de-blocked reconstructed source block.

As will be appreciated, these embodiments can, and in various embodiments do, include any one or more or each of the optional features described herein.

In these embodiments, generating a de-blocked reconstructed source block can take any suitable form. In various embodiments, generating the de-blocked reconstructed source block may comprise applying a de-blocking filter across all of the one or more reconstructed source blocks, i.e. so as to de-block the one or more reconstructed source blocks, e.g. by smoothing edges between the one or more reconstructed source blocks. The de-blocking process may be defined by the particular standard (e.g. HEVC standard) to be used when encoding the array of data elements.

The de-blocked reconstructed source block may correspond in size and/or shape (in terms of array elements) to the size and/or shape of the source block.

In these embodiments, generating a filtered de-blocked reconstructed source block can take any suitable form. In various embodiments, generating the filtered de-blocked reconstructed source block may comprise applying a sample adaptive offset filter in accordance with the selected set of sample adaptive offset options to all of the de-blocked reconstructed source block.

The filtered de-blocked reconstructed source block may correspond in size and/or shape (in terms of array elements) to the size and/or shape of the source block and/or the de-blocked reconstructed source block.

In these embodiments, the filtered de-blocked reconstructed source block may be stored and/or transmitted, as desired. In various embodiments, the filtered de-blocked reconstructed source block may be stored in a reference frame buffer, e.g. for use in encoding subsequent source blocks or otherwise.

In various embodiments, the method may further comprise performing an encoding process that encodes the source block, e.g. in accordance with a selected set of encoding options and/or sample adaptive offset options. Thus, the data processing apparatus may comprise processing circuitry configured to perform an encoding process that encodes a source block, e.g. in accordance with a selected set of options.

The encoding process can take any suitable form. The encoding process may be defined by the standard (e.g. HEVC standard) to be used when encoding the array of data elements. In embodiments, the encoding process may comprise entropy encoding.

The output of the encoding may accordingly be an encoded bitstream that comprises sets of encoded coefficients. The selected options, modes and/or motion vectors that were used in the encoding process may also be included in the bitstream. The encoded bitstream may then be output, e.g. to memory or streamed to another device, etc.

As will be appreciated, any of the processes that are performed in respect of a source block that corresponds to a region of the array may, in practice, be performed respectively for each (e.g. every) one of plural source blocks that correspond to the region or that correspond respectively to plural (different) regions of the array.

As will also be appreciated, any of the processes that are performed in respect of an array may, in practice, be performed respectively for each (e.g. every) one of plural arrays of the stream of arrays.

In any of the embodiments described herein, once encoded, the encoded source block(s) and/or encoded array and/or encoded stream of arrays may be used in any suitable way. For example, the encoded source block(s) and/or encoded array and/or encoded stream of arrays may be output, e.g. stored in memory and/or streamed to another device. Thus, the data processing apparatus may comprise output circuitry (e.g. write out circuitry) configured to output (e.g. write out) the encoded source block(s) and/or encoded array and/or encoded stream of arrays, e.g. to memory or to another device. Any selected options and/or motion vectors, if used, may also be output in a similar way.

The encoded source block(s) and/or encoded array and/or encoded stream of arrays may later be retrieved and/or received, e.g. for decoding. Thus, the data processing apparatus may comprise input circuitry (e.g. read in circuitry) configured to input (e.g. read in) the encoded source block(s) and/or encoded array and/or encoded stream of arrays, e.g. from memory. Any selected options and/or motion vectors, if used, may also be input in a similar way.

Encoding a source block may be followed by a decoding process that decodes the encoded source block. Thus, the data processing apparatus may comprise processing circuitry configured to perform a decoding process that decodes an encoded source block. The decoding process can take any suitable form, for example that corresponds to the encoding process that was used when encoding the encoded source block. The decoding process may be defined by the standard (e.g. HEVC standard) that was used when encoding the array of data elements. For example, the decoding process may comprise entropy decoding.

As will be appreciated, the (e.g. entropy) decoding may comprise producing one or more arrays of quantised coefficients for the encoded source block. The decoding process may then comprise generating one or more arrays of de-quantised coefficients by applying a (complete) de-quantisation process to the one or more arrays of quantised coefficients, generating one or more arrays of reconstructed difference values by applying a (complete) inverse transformation process to the one or more arrays of de-quantised coefficients, and/or generating a reconstructed source block by combining the one or more arrays of reconstructed difference values and the one or more reference blocks. Combining the one or more arrays of reconstructed difference values and the one or more reference blocks may comprise adding together the difference values of the one or more arrays of reconstructed difference values and the respective values of the corresponding (in terms of data position) data elements of the one or more reference blocks.

The decoding may further comprise generating a de-blocked reconstructed source block by applying a de-blocking filter to the reconstructed source block, and then generating a filtered de-blocked reconstructed source block by applying a sample adaptive offset filter (using the selected options) to the de-blocked reconstructed source block.

As discussed above, a reference block may comprise a motion compensated prediction block. The decoding may accordingly further comprise a motion compensation process that applies one or more motion vectors to one or more decoded arrays of data elements to derive the one or more reference blocks.

In any of the embodiments described herein, once determined, the data elements of the decoded source block may be used in any suitable way.

For example, the data elements of the decoded source block may be output (e.g. by an output (e.g. display) processor), e.g. for display. In these embodiments, the arrays of data elements may correspond to images, e.g. frames of image data, and the data elements may correspond to a pixel or pixels.

As will be appreciated, any of the processes that are performed in respect of an encoded source block of an encoded array may, in practice, be performed respectively for each (e.g. every) one of plural encoded source blocks of the encoded array.

As will also be appreciated, any of the processes that are performed in respect of an encoded array of an encoded stream of arrays may, in practice, be performed respectively for each (e.g. every) one of plural encoded arrays of an encoded stream of arrays.

The processes described herein in any embodiment may be performed by any suitable apparatus. For example, the processes described herein in any embodiment may be performed by a video processor (codec). The data processing apparatus described herein in any embodiment may therefore comprise or may be a video processor. Thus, the processing circuitry, output circuitry or write out circuitry, input circuitry or read in circuitry, etc. described herein in any embodiment may form part of a video processor. The data processing apparatus described herein in any embodiment may comprise, or may be, or may form part of, a system on chip (SoC).

The memory referred to herein may be any suitable memory of or for the data processing apparatus. The memory may be external to the data processing apparatus, e.g. video processor and/or system on chip (SoC). The memory may be, for example, main system memory.

The technology described herein can be used for all forms of data arrays that a data processing apparatus may provide and/or use, such as images or frames for display. Thus, as indicated above, the arrays of data elements may comprise image data and/or may correspond to images or frames of image data.

Various embodiments can correspondingly be used with and for any suitable encoding (e.g. video encoding) scheme (and standard). In various particular embodiments it is used with and for the HEVC encoding standard.

In various embodiments, the various functions described herein are carried out on a single data (e.g. image) processing platform that provides and/or uses the arrays of data elements.

As will be appreciated, the data processing apparatus according to various embodiments may be part of an overall data processing system that includes, for example, a host (e.g. central) processor. The host processor may, for example, execute applications that require data processing by the data processing apparatus. The host processor may send appropriate commands and data to the data processing apparatus to control it to perform the data processing operations and to generate and/or use an output required by applications executing on the host processor. To facilitate this, the host processor may execute a driver for the data processing apparatus and/or may execute a compiler or compilers for compiling programs to be executed by a programmable execution unit of the data processing apparatus.

In embodiments, the apparatus or system may comprise, and/or may be in communication with, one or more memories and/or memory devices that store the data described herein, and/or store software for performing the processes described herein. The apparatus or system may comprise, and/or may be in communication with a display for displaying images based on the data elements of the arrays. The apparatus or system may comprise, and/or may be in communication with a video camera that generates the arrays of data elements.

The technology described herein can be implemented in any suitable system, such as a suitably configured computer or micro-processor based system. In various embodiments, the technology described herein is implemented in a computer and/or micro-processor based system.

The various functions of the technology described herein can be carried out in any suitable manner. For example, the steps and functions of the technology described herein can be implemented in hardware or software, as desired. Thus, for example, unless otherwise indicated, the various circuitry, functional elements, stages, and "means" of the technology described herein may comprise a suitable processor or processors, controller or controllers, functional units, circuitry, processing logic, microprocessor arrangements, etc., that are operable to perform the various steps or functions, etc., such as appropriately dedicated hardware elements (processing circuitry) and/or programmable hardware elements (processing circuitry) that can be programmed to operate in the desired manner.

The various steps or functions, etc., of the technology described herein may be duplicated and/or carried out in parallel on a given processor. Equally, the various processing stages may share processing circuitry, etc., if desired.

Subject to any hardware necessary to carry out the specific steps or functions, etc., discussed above, the system can otherwise include any one or more or all of the usual functional units, etc., that data processing apparatus and/or systems include.

The various data processing stages can accordingly be implemented as desired and in any suitable manner, and can perform any suitable functions, respectively. Similarly, the various data can be defined and stored in any suitable manner.

It will also be appreciated by those skilled in the art that all of the described embodiments of the technology described herein can, and in an embodiment do, include, as appropriate, any one or more or all of the features described herein.

The methods in accordance with the technology described herein may be implemented at least partially using software e.g. computer programs. Thus, further embodiments the technology described herein comprise computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processor. The data processor may be a microprocessor system, a programmable FPGA (field programmable gate array), etc.

The technology described herein also extends to a computer software carrier comprising such software which when used to operate a data processing apparatus or system comprising a data processor causes in conjunction with said data processor said apparatus or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus in further embodiments comprise computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non-transitory medium, such as a computer readable medium, for example, diskette, CD, DVD, ROM, RAM, flash memory, or hard disk. It could also comprise a series of computer readable instructions transmittable to a computer system, via a modem or other interface device, either over a tangible medium, including but not limited to optical or analogue communications lines, or intangibly using wireless techniques, including but not limited to microwave, infrared or other transmission techniques. The series of computer readable instructions embodies all or part of the functionality previously described herein.

Such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, pre-loaded with a computer system, for example, on a system ROM or fixed disk, or distributed from a server or electronic bulletin board over a network, for example, the Internet or World Wide Web.

Embodiments of the technology described herein will now be described with reference to the Figures.

The drawings show elements of a data processing apparatus and system that are relevant to embodiments of the technology described herein. As will be appreciated by those skilled in the art there may be other elements of the data processing apparatus and system that are not illustrated in the drawings. It should also be noted here that the drawings are only schematic, and that, for example, in practice the shown elements may share significant hardware circuits, even though they are shown schematically as separate elements in the drawings.

As discussed above, embodiments of the technology described herein relate to arrangements that comprise encoding an array of data elements. Various embodiments of the technology described herein will now be described in the context of the encoding frames of image data for display. However, the concepts described herein can equally be applied to contexts in which arrays of other types of data are to be encoded.

FIG. 1 shows schematically an embodiment of a data processing system 200 that can provide and use data arrays, such as frames for display, that have been encoded in the manner of the present embodiments.

In this embodiment, the system 100 comprises a data processing apparatus in the form of a system on chip (SoC) 102. The system 100 also comprises off-chip (main) memory 116, a display device 118 and a video camera 120.

The SoC 102 comprises a central processing unit (CPU) 104, a graphics processing unit (GPU) 106, a video processor 108, a display controller 110, an interconnect 112 and a memory controller 114.

As is shown in FIG. 1, the CPU 104, GPU 106, video processor 108, and display controller 110 communicate with each other via the interconnect 112 and with the memory 116 via the interconnect 112 and memory controller 114. The display controller 110 also communicates with the display device 118. The video camera 120 also communicates with the SoC 102 via the interconnect 112.

In the following embodiments, the video processor 108 reads in image data from memory 116, encodes the image data, and then outputs that encoded image data, e.g. for storage in memory 116 or for streaming to another device. The encoded image data can later be retrieved and decoded, e.g. by the video processor 108, or received and decoded by another device. The decoded image data can then be output, e.g. by the display controller 110 to the display device 118 or by another device, for display.

Figure 2:
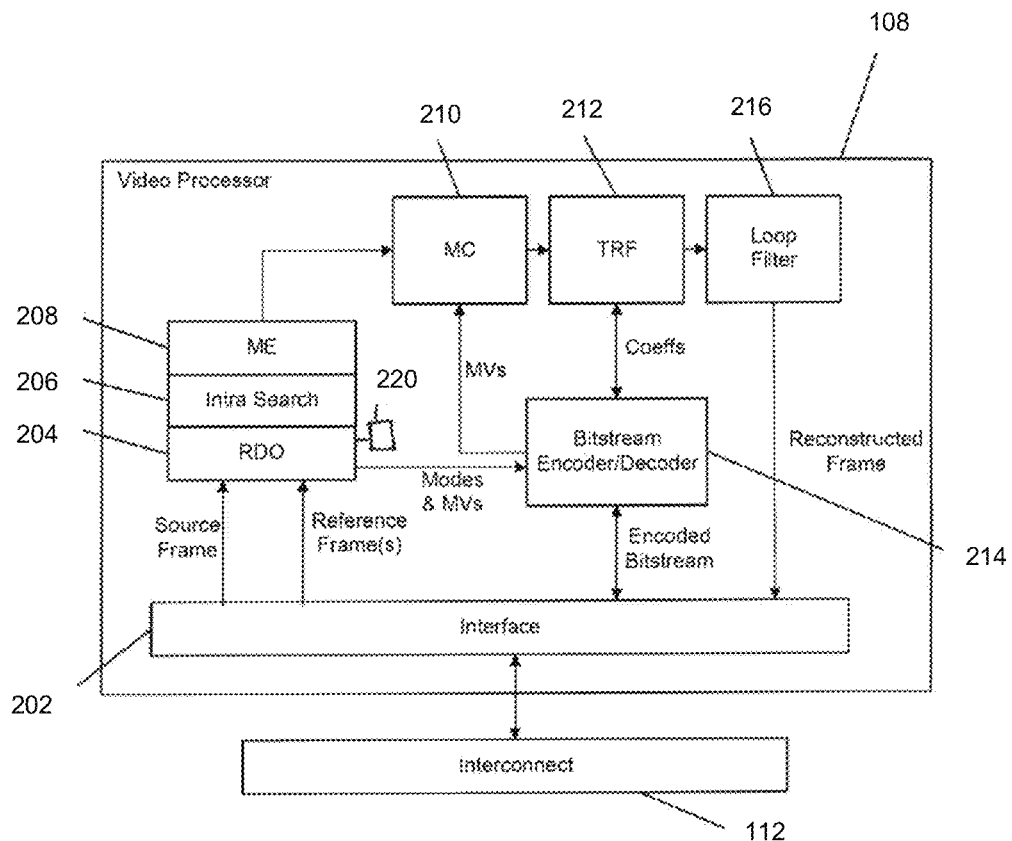
FIG. 2 shows schematically a video processor according to embodiments of the technology described herein.

FIG. 2 shows further details of a video processor 108 that can be used to encode and decode a stream of arrays of data elements, such as frames for display, in the manner of the present embodiments.

In this embodiment, the video processor 108 comprises an interface 202 that can provide, via the interconnect 112, a current "source" frame to be encoded. In a similar manner, the interface 202 can provide, via the interconnect 112, one or more previous and/or subsequent "reference" frames that may be used when encoding the source frame.

In this embodiment, the source frame is divided into plural source blocks to be encoded on a block by block basis. Each source block is initially 64×64 data elements (pixels) in size. Each source block can, however, be further divided into a number of 8×8, 16×16 or 32×32 source blocks, e.g. if that would provide for less costly encoding.

Figure 3:
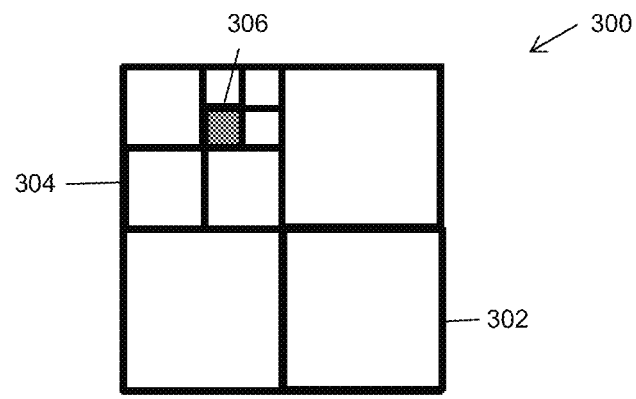
FIG. 3 shows schematically a Coding Tree Unit (CTU) that may be encoded in accordance with embodiments of the technology described herein.

This is illustrated by FIG. 3. FIG. 3 shows one particular 64×64 source block, or Coding Tree Unit (CTU) 300, into which the source frame is divided. Each 64×64 source block (CTU) 300 is further divided into a number of smaller sub-blocks, or Coding Units (CUs). The particular CTU 300 illustrated in FIG. 3 is divided into three 32×32 CUs 302, three 16×16 CUs 304, and four 8×8 CUs 306. Other source block sizes are arrangements could of course be used as desired.

In this embodiment, a source block can be encoded using another block within the source frame itself, i.e. using "intra" mode encoding. The video processor 208 accordingly comprises intra search circuitry 306 that, for a given source block in the source frame, searches within the source frame itself for one or more suitable candidate reference blocks to consider using when encoding that source block. The one or more candidate reference blocks may be selected using any suitable metric that indicates the similarity or difference between the source block and the potential reference block in question, such as a sum of absolute differences (SAD) value.

In this embodiment, the one or more reference frames are also divided into plural blocks (which may correspond in size to the source block) that may be used when encoding the source frame, i.e. using "inter" mode encoding. The video processor 208 accordingly comprises ME (motion estimation) circuitry 308 that, for a given source block in the source frame, searches within the one or more reference frames for one or more suitable candidate reference blocks to consider using when encoding that source block. A candidate reference block can be derived by using a motion vector (MV) that describes how a particular block of a particular frame is mapped (e.g. by translation, rotation and/or scaling) to that candidate reference block. Again, the one or more candidate reference blocks may be selected using any suitable metric that indicates the similarity or difference between the source block and the potential reference block in question, such as a sum of absolute differences (SAD) value.

RDO (Rate Distortion Optimisation) circuitry 304 then performs an RDO process in respect of each source block using the candidate reference blocks for that source block. In this embodiment, the output of the RDO circuitry 304 comprises a selected set of encoding options for a particular source block (e.g. having a particular size in terms of data elements of the frame). In this embodiment, the selected set of encoding options further comprises a particular way to derive a reference block for that particular source block (e.g. the encoding mode to be used, such as intra, inter, unidirectional, bidirectional, merge, etc., mode, and/or the motion vector to be used).

Each source block is then encoded using the selected set of encoding options.

In this process, a selected reference block that is to be used to encode a selected source block is provided. For example, where the source block is to be encoded in inter mode, MC (motion compensation) circuitry 310 applies a selected motion vector generated by the ME circuitry 308 to a selected reference frame to derive the selected reference block. Similarly, where the source block is to be encoded in intra mode, a selected reference block of the source frame is derived by TRF (transform) circuitry 312.

In either case, the TRF circuitry 312 then subtracts the data elements of the selected source block from the data elements of the selected reference block to generate a set of difference values. The TRF circuitry 312 then applies a full forward discrete cosine transformation process to the set of difference values to generate a set of frequency domain coefficients. The TRF circuitry 312 then applies a full quantisation process to the set of frequency domain coefficients to generate a set of quantised coefficients.

A bitstream encoder/decoder 314 then encodes the coefficients for the source block that are generated by the TRF circuitry 312. The encoding scheme can comprise any suitable entropy (variable length) coding scheme.

As will be appreciated, the above encoding process is then repeated for each selected source block of the source frame using the selected sets of encoding options for the source frame.

The output of the bitstream encoder/decoder 314 is accordingly an encoded bitstream that comprises sets of encoded coefficients. The selected modes and/or motion vectors that were used in the encoding process are also included in the bitstream.

The encoded bitstream can then be output, e.g. to memory 216 or streamed to another device, via the interface 302.

As discussed above, the technology described herein and thus the present embodiments relate in particular to the process of determining which sample adaptive offset (SAO) filter options to use when encoding a given source block.

Sample adaptive offset (SAO) is a mechanism in the video standard HEVC to encode final pixel values by means of an offset, which is applied in a final decoding pass to each pixel after de-blocking. The sample adaptive offset (SAO) filter attempts to reduce banding and ringing artefacts.

In the sample adaptive offset (SAO) process, the particular offset value or values to be used by the sample adaptive offset filter depends on the type of each pixel. The offset may be one of two different types, namely a band offset or an edge offset. The sample adaptive offset type to be used is set per coding tree unit (CTU), typically a 64×64 block.

In band offset SAO, the offset to be applied to a pixel depends solely on the five most significant bits of the pixel value before the SAO filter is applied. If the current pixel lies in one of four bands active in the CTU, an offset, encoded in the bitstream, specific to the particular band is applied to the pixel.

In edge offset SAO, a certain direction (0, 45, 90 or 135 degrees) is specified per CTU, and the offset to be applied to a particular pixel depends on the pixel values on both sides of the particular pixel in the specified direction as:

$$\text{Edge\_class}=2+\text{sign}(\text{Pixval}(-1)-\text{Pixval}(0))+\text{sign}(\text{Pixval}(1)-\text{Pixval}(0)).$$

Here, Pixval(0) is the value of the particular pixel, and Pixval(−1) and Pixval(1) are the values of the pixels on either side of the particular pixel in the specified direction. If the edge_class is 0, 1, 3 or 4, an offset associated with each class, again encoded in the bitstream for that CTU, is added to the particular pixel.

Figure 4:
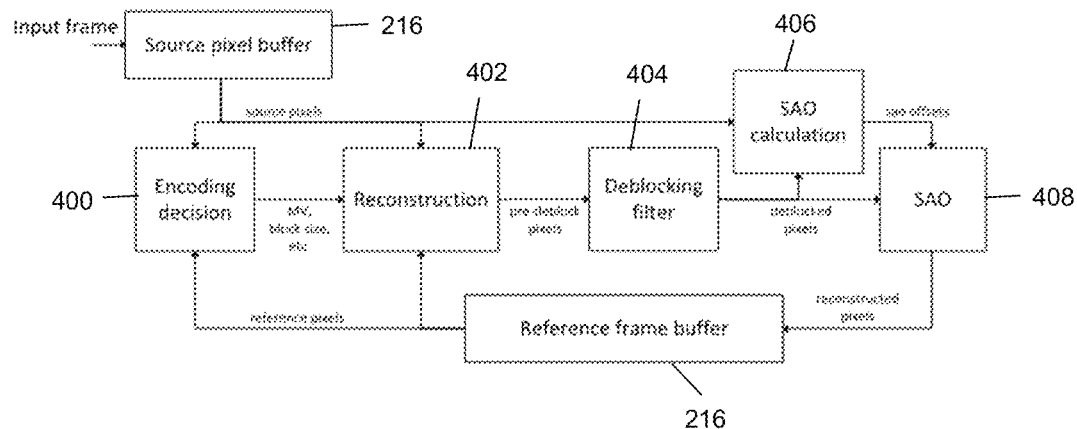
FIG. 4 shows schematically a data processing system.

FIG. 4 shows in detail a process for selecting a particular set of sample adaptive offset (SAO) filter options.

As shown in FIG. 4, a source pixel buffer 216 stores the input (source) frame, which can be provided to various blocks in the video processor 208.

As described above, an encoding decision block 400 makes encoding decisions, e.g. by performing motion estimation 308, i.e. getting the motion vectors, and deciding on the source block size and block type (i.e. intra or inter, etc.), e.g. by means of the RDO process 304 described above.

As also described above, a reconstruction block 402 generates reconstructed source blocks, e.g. by performing the prediction given from the encoding decision block 400, performing a Discrete Cosine Transform (DCT) on the residual (the difference between the source block and predicted block), quantizing the DCT coefficients and reconstructing the source pixels using an inverse a Discrete Cosine Transform (i-DCT).

In the technique illustrated in FIG. 4, a de-blocking filter 404 then performs de-blocking on the reconstructed source blocks, i.e. by smoothing the edges between blocks.

A SAO calculation block 406 then determines which set of sample adaptive offset options to use for each source block (CTU), to try to minimise banding and ringing artefacts, i.e. in order to get as close as possible to the original source pixels.

In the technique illustrated in FIG. 4, this is done using the de-blocked source blocks to determine a distortion value that is indicative of an amount of distortion that would be introduced when encoding and then decoding the source block in accordance with the particular set of sample adaptive offset options under consideration.

Once a particular set of SAO options have been determined, then a SAO block 408 applies the SAO offsets to the appropriate pixels, i.e. in accordance with the selected options.

The so-filtered block or data elements may then be stored in a reference frame buffer, e.g. in the external (off-chip) random access memory (RAM) 216, i.e. so that they can be used for encoding future frames.

Figure 5:
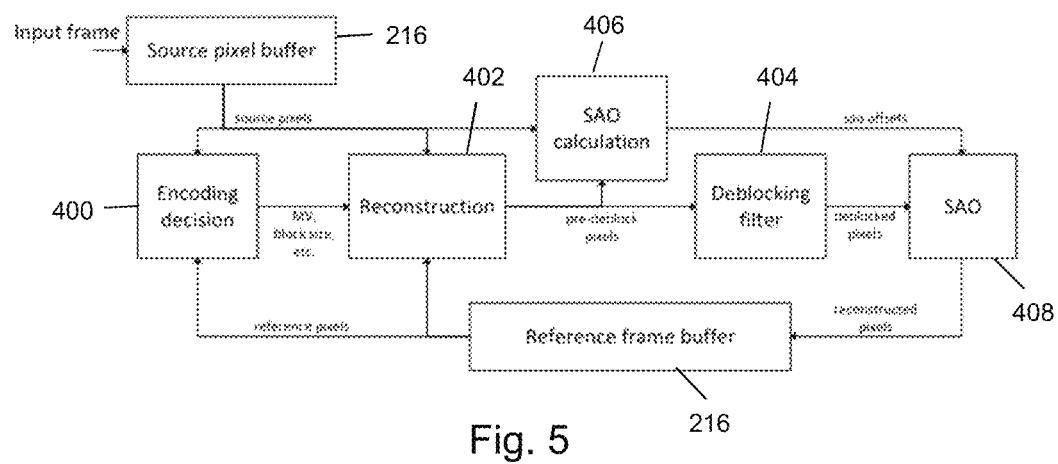
FIG. 5 shows schematically a data processing system according to embodiments of the technology described herein.

FIG. 5 shows in detail an improved process for selecting a particular set of sample adaptive offset (SAO) filter options in accordance with various embodiments.

As can be seen in FIG. 5, in the present embodiments, rather than determining the distortion value using reconstructed source blocks that have been subjecting to de-blocking, the distortion value is instead determined using reconstructed source blocks that have not been de-blocked, i.e. prior to the reconstructed source blocks being de-blocked.

That is, in the present embodiment, the choice of which SAO type, offsets, and direction (in the case of edge offset SAO), to use is determined depending on the pixel values prior to de-blocking in an encoding pass.

In the present embodiment, this is done by evaluating all possible alternatives for the particular CTU, including the alternatives to merge SAO settings from adjacent CTUs (e.g. the CTU to the left or above), etc., i.e. as are offered by the particular specification.

Thus, in the present embodiment, a SAO options selection is made by determining how successful each of the plural sample adaptive offset filter types is, e.g. in minimising error. This is done by applying each of the plural sample adaptive offset filter types for the block of data elements, e.g. in turn or otherwise, and in each case then comparing the resulting filtered data block with the original source data block, and determining the degree of difference between the filtered data block and the original source data block. This may be done by comparing each data element on a data element by data element basis, and accumulating (summing) the differences (error) therebetween.

Once a distortion value has been determined for each of the plural sample adaptive offset filter types, one of the SAO filter types may be selected for use, i.e. based at least in part on the error values.

In the present embodiment, the particular set of options that minimizes the rate-distortion metric SSE+lambda*bits is chosen for use for the particular CTU. Here, "SSE" is the sum of squared errors over all pixels of the CTU after applying a particular SAO encoding alternative, and "bits" is the number of bits needed to specify that SAO alternative in the bitstream. The lambda parameter depends on a quality parameter qp for the encoding.

The Applicants have found that performing these calculations before the de-blocking stage 404 removes almost all dependencies between CTUs, and is a significant simplification. The only remaining dependencies that must be tracked are the SAO settings that were used for the CTU immediately to the left and above of the current CTU (in the frame).

The means that the complexity of and the memory requirements for the encoding process are reduced. This in turn means that the processing and/or memory bandwidth requirements for the encoding operation are reduced, thereby reducing the power and bandwidth requirements and/or increasing the performance of the overall data processing system.

Figure 6:
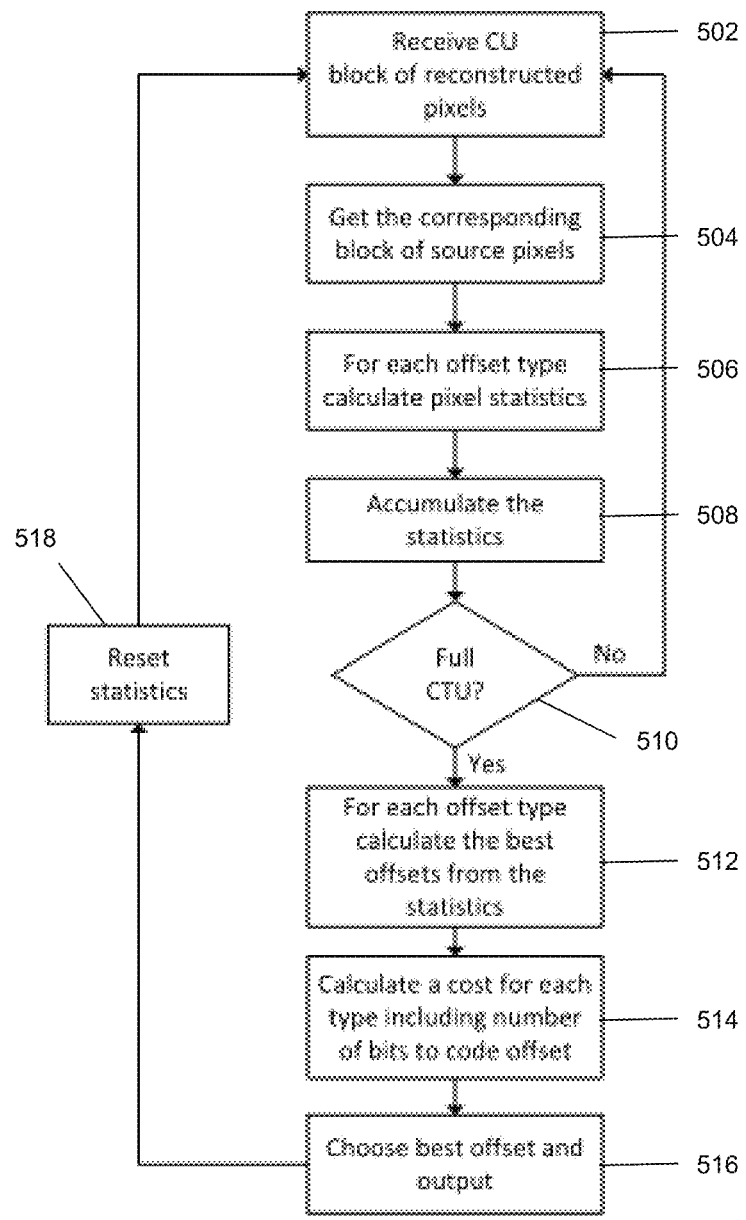
FIG. 6 shows schematically a method of selecting a set of sample adaptive offset options based on a cost value according to embodiments of the technology described herein.

FIG. 6 illustrates a process for selecting a set of sample adaptive offset options in accordance with the present embodiment.

As shown in FIG. 6, the process begins by obtaining a CU block of reconstructed pixels (step 502) and the corresponding block of source pixels (step 504). For each set of SAO options that are to be considered for the CTU in question, a distortion value is determined by comparing a version of the CU block that has been subjected to the SAO filtering under consideration to the source block and determining a set of error values (or pixel statistics) for the CU (step 506).

These pixel statistics are accumulated across the CTU, in respect of each CU (step 508). Thus, in step 510, a determination is made as to whether the entire CTU has been assessed. If this is not the case, then the process loops back to step 502 and continue with the next CU.

If the CTU is complete, then for each SAO type, the best offsets to be used are determined from the statistics (step 512), a cost for each SAO type is determined that includes a bit cost to encoded the particular offset (step 514), and then the best offset options are chosen and output (step 516).

Once this process has been complete in respect of a particular CTU, then the statistics are reset (step 518), and the process is repeated for the next CTU, and so on.

In the present embodiment, as described above, determining the distortion value using reconstructed source blocks that have not been de-blocked could result in a distortion value that does not accurately reflect the combined effect of the de-blocking filter 404 and the sample adaptive offset filter 408, e.g. since the effect of the de-blocking filter 404 is not taken into account. In other words, looking at pixels before the de-blocking stage 404 to decide how they should be altered by the SAO stage 408 after the de-blocking stage 404, could lead to sub-optimal choices of sample adaptive offset filter options.

To counteract this, in the present embodiment, when the particular set of sample adaptive offset options comprises an edge offset sample adaptive offset type, the distortion value is determined using less than all of the reconstructed block pixels in the SSE calculation, in particular by not performing the edge offset evaluations for all pixels on the border of a CU block, i.e. by discarding all pixels on the border of a CU block for use as centre pixels in the edge offset evaluations.

This is beneficial for two reasons. Firstly, the pixels on the border of a CU block may be altered by the de-blocking stage 404, and hence change the edge class for these pixels, leading to erroneous classifications and a sub-optimal choice of offsets. The quality of the encoding is thus improved by omitting these pixels in the calculations.

Secondly, since the pixel on one side of a centre pixel located on the border of a CU block will lie outside of that block, memory space can be saved and processing latency can be decreased by not having to store and depend on pixels in neighbouring CU blocks.

This process is illustrated by FIG. 7. As can be seen from FIG. 7, the border pixels of a CU 306, shown here with diagonal shading for the topmost part of a 8×8 CU 306, are not used as centre pixels for the edge offset evaluations. In particular the shaded pixels outside of the CU 306 are not used for this CU's centre pixel calculations.

Figure 7A:
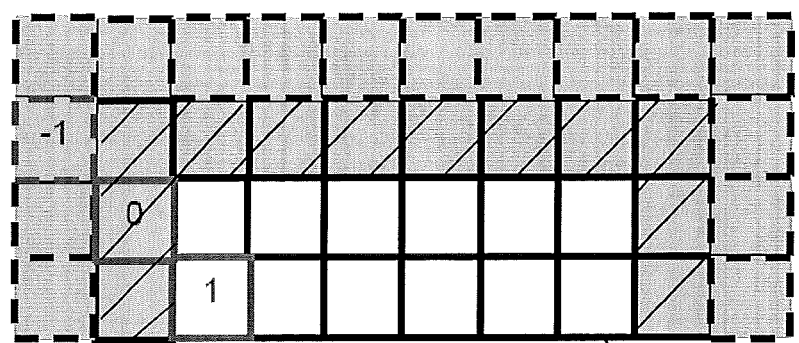
FIGS. 7A and 7B show schematically a Coding Unit (CU) of the Coding Tree Unit (CTU) of FIG. 3.
Figure 7B:
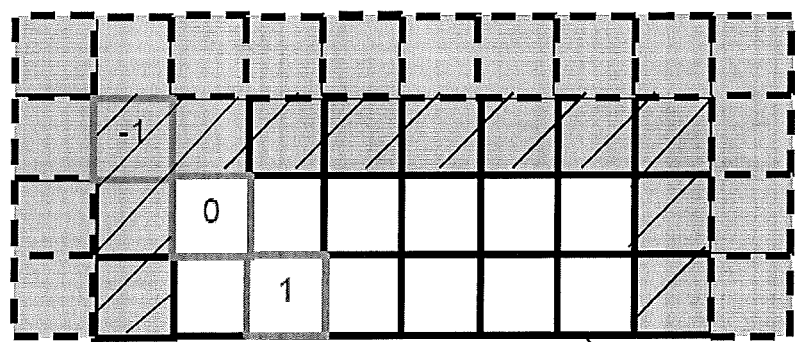

In FIG. 7A, the three highlighted pixels indicate an edge offset evaluation that is not performed. In contrast, FIG. 7B the three highlighted pixels indicate an edge offset evaluation that is performed.

In this regard, the Applicants have recognised that where the sample adaptive offset filter type selection is made before de-blocking, the de-blocking filter 404 can act to change some of the data element values for the source, and that such changes will typically only affect data elements near or at the edge of each source sub-block (CU) 306. This is because the de-blocking filter acts to try to smooth sharp edges which can form between sub-blocks, i.e. at the edges of each sub-block.

As such, in the present embodiment, the sample adaptive offset filter type selection is made without considering the data elements of the CU for which it is known or for which it can be predicted the data values will be changed by the de-blocking filter 404.

In this regard, the Applicants have found that although this means that the sample adaptive offset filter type selection is made without considering all of the data elements of the block, a suitable and accurate selection can nevertheless be made by considering only these data elements. Moreover, this can provide a significant saving in processing and memory requirements.

In the present embodiment, the CU border pixels can be discarded for the band offset type evaluations, or not, as desired. In this regard, the Applicants have found that these calculations are less sensitive to the de-blocking stage 404, and so it may, in some cases, be better to include the border pixels in the evaluations, e.g. to obtain more accurate statistical measurements.

In the present embodiment, once these processes have been completed in respect of each sub-block of a source block, the source block is then subjected to de-blocking, followed by SAO filtering (using the selected SAO filter type). The filtered block of data may then be stored and/or transmitted, as desired.

In the present embodiment, the output of the encoding will accordingly be an encoded bitstream that comprises sets of encoded coefficients. The selected options and/or motion vectors, etc. that were used in the encoding process may also be included in the bitstream. The encoded bitstream may then be output, e.g. to memory or streamed to another device, etc.

A process of decoding an encoded source block will also now be described with reference to FIG. 2.

First, an encoded bitstream is provided, e.g. from memory 116 or from another device, via the interface 202.

The bitstream encoder/decoder 214 then decodes the encoded bitstream to generate a set of quantised coefficients for the source block to be reconstructed. The decoding scheme can comprises any suitable decoding scheme that corresponds to the entropy encoding scheme that was used to encode the bitstream.

The TRF circuitry 212 then applies a full de-quantisation process to the set of quantised coefficients to generate a set of frequency domain coefficients for the source block to be reconstructed. The TRF circuitry 212 then applies a full inverse discrete cosine transformation process to the set of frequency domain coefficients to generate a set of difference values for the source block to be reconstructed.

A reference block that was used to encode the source block is also provided. For example, where the source block was encoded in inter mode, the relevant reference block is derived from a previously reconstructed reference frame. Similarly, where the source block was encoded in intra mode, the relevant reference block is derived from a previously reconstructed region of the source frame.

In either case, the TRF circuitry 212 then adds the set of difference values to the data elements of the reference block to generate the data elements of the reconstructed source block.

As will be appreciated, the above decoding process is then repeated for each source block of the source frame.

A loop filter 216 is then used to smooth or "de-block" the regions of the reconstructed source frame and to apply the SAO filter using the selected SAO options. The reconstructed source frame can then be output, e.g. for display, via the interface 202.

Other arrangements for the data processing system 100, data processing apparatus 102 and video processor 108 would, of course, be possible.

It should again be noted here that the drawings are only schematic, and that, for example, in practice the shown elements may share significant hardware circuits, even though they are shown schematically as separate elements in the drawings. For example, one or more of the processes that are performed in the SAO options selection process may be performed using the same circuitry as the equivalent steps that are performed in the encoding and/or decoding processes.

It can be seen from the above that the technology described herein, in its embodiments at least, can provide a more efficient way of selecting sample adaptive offset options to use when encoding a source block of data elements of an array of data elements. This is achieved, in embodiments of the technology described herein at least, by selecting SOA filter options using one or more reconstructed source blocks prior to the one or more reconstructed source blocks being de-blocked.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

What is claimed is:

1. A method of selecting sample adaptive offset options to use when encoding an array of data elements of a stream of arrays of data elements, the method comprising:
   determining a distortion value for a particular set of sample adaptive offset options by:
     generating one or more filtered reconstructed source blocks by applying a sample adaptive offset filter in accordance with the particular set of sample adaptive offset options to one or more reconstructed source blocks corresponding to a source block of the array of data elements being encoded;
     generating a set of error values by comparing the one or more filtered reconstructed source blocks with the source block; and
     determining a distortion value for the particular set of sample adaptive offset options using the set of error values;
   the method further comprising:
   selecting, based on the distortion value, whether to encode the source block using the particular set of sample adaptive offset options;
   wherein for the particular set of sample adaptive offset options comprising an edge offset, the determining of the distortion value comprises using a set of error values comprising fewer data values than the source block of data elements;
   wherein the set of error values that is used to determine the distortion value comprises an array of error values;
   wherein for the particular set of sample adaptive offset options comprising an edge offset, the array of error values corresponds to an inner sub-region of a reconstructed source block and the array of error values corresponds to all of the inner data elements of a reconstructed source block.

2. The method of claim 1, further comprising using the source block and one or more reference blocks of data elements derived from one or more arrays of data elements of the stream of arrays of data elements to generate the one or more reconstructed source blocks corresponding to the source block.

3. The method of claim 1, wherein for the particular set of sample adaptive offset options comprising an edge offset, the one or more filtered reconstructed source blocks comprise fewer data elements than the source block of data elements.

4. The method of claim 1, wherein the particular set of sample adaptive offset options comprise (i) a sample adaptive offset filter type; (ii) one or more particular offset values; and/or (iii) a direction in which an offset or offsets should be applied.

5. The method of claim 1, wherein for the particular set of sample adaptive offset options comprising a band offset, the determining of the distortion value comprises using a set of error values comprising the same number of data values as or fewer data values than the source block of data elements.

6. The method of claim 1, further comprising:
   generating a de-blocked reconstructed source block by applying a de-blocking filter to the one or more reconstructed source blocks.

7. The method of claim 6, further comprising:
   generating a filtered de-blocked reconstructed source block by applying a sample adaptive offset filter in accordance with the selected set of sample adaptive offset options to the de-blocked reconstructed source block.

8. The method of claim 1, comprising:
   selecting whether to encode the source block using the particular set of sample adaptive offset options based on the distortion value and a bit count value for the particular set of sample adaptive offset options.

9. An apparatus for selecting sample adaptive offset options to use when encoding an array of data elements of a stream of arrays of data elements, the apparatus comprising:
   distortion value determining circuitry, operable to determine a distortion value for a particular set of sample adaptive offset options by:
     generating one or more filtered reconstructed source blocks by applying a sample adaptive offset filter in accordance with the particular set of sample adaptive offset options to one or more reconstructed source blocks corresponding to a source block of the array of data elements being encoded;
     generating a set of error values by comparing the one or more filtered reconstructed source blocks with the source block; and
     determining a distortion value for the particular set of sample adaptive offset options using the set of error values; and
   sample adaptive offset option selection circuitry operable to select a set of sample adaptive offset options to be used when encoding the source block based on the distortion value;
   wherein the distortion value determining circuitry is operable, for the particular set of sample adaptive offset options comprising an edge offset, to determine the distortion value using a set of error values comprising fewer data values than the source block of data elements;
   wherein the set of error values that is used to determine the distortion value comprises an array of error values;
   wherein for the particular set of sample adaptive offset options comprising an edge offset, the array of error values corresponds to an inner sub-region of a reconstructed source block and the array of error values corresponds to all of the inner data elements of a reconstructed source block.

10. The apparatus of claim 9, further comprising reconstructed source block generating circuitry operable to generate one or more reconstructed source blocks corresponding to the source block using the source block and one or more reference blocks of data elements derived from one or more arrays of data elements of the stream of arrays of data elements.

11. The apparatus of claim 9, wherein the distortion value determining circuitry is operable, for the particular set of sample adaptive offset options comprising an edge offset, to generate one or more filtered reconstructed source blocks comprising fewer data elements than the source block of data elements.

12. The apparatus of claim 9, wherein the particular set of sample adaptive offset options comprise (i) a sample adaptive offset filter type; (ii) one or more particular offset values; and/or (iii) a direction in which an offset or offsets should be applied.

13. The apparatus of claim 9, wherein the distortion value determining circuitry is operable, for the particular set of sample adaptive offset options comprising a band offset, to determine the distortion value using a set of error values comprising the same number of data values as or fewer data values than the source block of data elements.

14. The apparatus of claim 9, further comprising de-blocking circuitry operable to generate a de-blocked reconstructed source block by applying a de-blocking filter to the one or more reconstructed source blocks.

15. The apparatus of claim 14, further comprising:
sample adaptive offset circuitry operable to generate a filtered de-blocked reconstructed source block by applying a sample adaptive offset filter in accordance with the selected set of sample adaptive offset options to the de-blocked reconstructed source block.

16. The apparatus of claim 9, wherein the sample adaptive offset option selection circuitry is operable to select a set of sample adaptive offset options to be used when encoding the source block based on the distortion value and a bit count value for the particular set of sample adaptive offset options.

17. A non-transitory computer readable storage medium storing computer software code which when executing on a processor performs a method of selecting sample adaptive offset options to use when encoding an array of data elements of a stream of arrays of data elements, the method comprising:
determining a distortion value for a particular set of sample adaptive offset options by:
generating one or more filtered reconstructed source blocks by applying a sample adaptive offset filter in accordance with the particular set of sample adaptive offset options to one or more reconstructed source blocks corresponding to a source block of the array of data elements being encoded;
generating a set of error values by comparing the one or more filtered reconstructed source blocks with the source block; and
determining a distortion value for the particular set of sample adaptive offset options using the set of error values;
the method further comprising:
selecting, based on the distortion value, whether to encode the source block using the particular set of sample adaptive offset options;
wherein for the particular set of sample adaptive offset options comprising an edge offset, the determining of the distortion value comprises using a set of error values comprising fewer data values than the source block of data elements;
wherein the set of error values that is used to determine the distortion value comprises an array of error values;
wherein for the particular set of sample adaptive offset options comprising an edge offset, the array of error values corresponds to an inner sub-region of a reconstructed source block and the array of error values corresponds to all of the inner data elements of a reconstructed source block.

18. The method of claim 1, wherein the step of generating the one or more filtered reconstructed source blocks comprises generating the one or more filtered reconstructed source blocks by applying the sample adaptive offset filter in accordance with the particular set of sample adaptive offset options to one or more reconstructed source blocks that have other than been de-blocked.

19. The apparatus of claim 9, wherein the distortion value determining circuitry is operable to generate the one or more filtered reconstructed source blocks by applying the sample adaptive offset filter in accordance with the particular set of sample adaptive offset options to one or more reconstructed source blocks that have other than been de-blocked.

* * * * *